US008271624B2

(12) United States Patent
Owen

(10) Patent No.: US 8,271,624 B2
(45) Date of Patent: Sep. 18, 2012

(54) METHODS, SYSTEMS, AND APPARATUS FOR DETERMINING AND AUTOMATICALLY PROGRAMMING NETWORK ADDRESSES FOR DEVICES OPERATING IN A NETWORK

(75) Inventor: Gary M. Owen, Raleigh, NC (US)

(73) Assignee: Parata Systems, LLC, Durham, NC (US)

( * ) Notice: Subject to any disclaimer, the term of this patent is extended or adjusted under 35 U.S.C. 154(b) by 190 days.

(21) Appl. No.: 12/690,448

(22) Filed: Jan. 20, 2010

(65) Prior Publication Data

US 2010/0185754 A1 Jul. 22, 2010

Related U.S. Application Data

(60) Provisional application No. 61/145,772, filed on Jan. 20, 2009.

(51) Int. Cl.

| | |
|---|---|
| ***G06F 15/177*** | (2006.01) |
| ***G06F 15/16*** | (2006.01) |
| ***G06F 7/00*** | (2006.01) |
| ***G06F 17/00*** | (2006.01) |
| ***G06F 19/00*** | (2011.01) |
| ***G06Q 10/00*** | (2012.01) |
| ***G05B 15/00*** | (2006.01) |
| ***G11B 17/22*** | (2006.01) |
| ***G06K 15/00*** | (2006.01) |

(52) U.S. Cl. ........ 709/220; 709/221; 709/223; 709/227; 705/28; 700/215; 700/231; 700/232; 700/235; 700/237; 700/242; 700/243; 700/245; 700/264; 369/30.27; 369/30.31; 369/30.36; 369/30.38; 235/375; 235/383; 235/385

(58) Field of Classification Search ........................ None
See application file for complete search history.

(56) References Cited

U.S. PATENT DOCUMENTS

| | | | | |
|---|---|---|---|---|
| 4,231,105 | A * | 10/1980 | Schuller et al. | 700/90 |
| 4,812,629 | A * | 3/1989 | O'Neil et al. | 235/383 |
| 5,159,560 | A * | 10/1992 | Newell et al. | 700/215 |
| 5,249,687 | A * | 10/1993 | Rosenbaum et al. | 209/3.3 |
| 5,883,864 | A * | 3/1999 | Saliba | 360/92.1 |
| 5,907,493 | A * | 5/1999 | Boyer et al. | 700/231 |
| 6,707,381 | B1 * | 3/2004 | Maloney | 340/568.1 |
| 6,710,962 | B1 * | 3/2004 | Caverly et al. | 360/69 |
| 6,725,394 | B1 * | 4/2004 | Bolt | 714/5.11 |
| 6,766,412 | B2 * | 7/2004 | Bolt | 711/111 |
| 7,062,455 | B1 * | 6/2006 | Tobey | 705/28 |

(Continued)

OTHER PUBLICATIONS

Office Action issued in corresponding Canadian Patent Application No. 2,690,506, mailed Jun. 7, 2012.

*Primary Examiner* — Ario Etienne
*Assistant Examiner* — Ho Shiu
(74) *Attorney, Agent, or Firm* — Myers Bigel Sibley & Sajovec, P.A.

(57) ABSTRACT

A method for configuring a network device including an optical sensor includes activating the optical sensor of the network device to generate data representing an image in view thereof, and analyzing the data from the optical sensor to determine image information represented by the image. A network address is automatically assigned to the network device based on the image information represented by the image in view of the optical sensor. Related methods, systems, and apparatus are also discussed.

21 Claims, 10 Drawing Sheets

U.S. PATENT DOCUMENTS

| | | | | |
|---|---|---|---|---|
| 7,111,781 | B2 * | 9/2006 | Fletcher | 235/385 |
| 7,228,200 | B2 | 6/2007 | Baker et al. | |
| 7,751,932 | B1 * | 7/2010 | Fedor et al. | 700/236 |
| 7,783,378 | B2 * | 8/2010 | Pinney et al. | 700/237 |
| 7,857,161 | B2 * | 12/2010 | Pinney et al. | 221/10 |
| 8,019,926 | B2 * | 9/2011 | Byers et al. | 711/4 |
| 8,112,557 | B2 * | 2/2012 | Wideman | 710/19 |
| 2002/0130135 | A1 * | 9/2002 | Fitzgerald et al. | 221/92 |
| 2002/0173875 | A1 * | 11/2002 | Wallace et al. | 700/242 |
| 2003/0216831 | A1 * | 11/2003 | Hart et al. | 700/235 |
| 2004/0088187 | A1 * | 5/2004 | Chudy et al. | 705/2 |
| 2004/0113786 | A1 * | 6/2004 | Maloney | 340/568.1 |
| 2004/0193315 | A1 * | 9/2004 | Lunak et al. | 700/243 |
| 2004/0193316 | A1 * | 9/2004 | Lunak et al. | 700/243 |
| 2004/0207512 | A1 * | 10/2004 | Bastian, II | 340/5.92 |
| 2004/0208372 | A1 * | 10/2004 | Boncyk et al. | 382/181 |
| 2004/0263428 | A1 * | 12/2004 | Sudo | 345/7 |
| 2005/0036407 | A1 * | 2/2005 | Dickey et al. | 369/30.31 |
| 2005/0036408 | A1 * | 2/2005 | Dickey et al. | 369/30.36 |
| 2005/0054004 | A1 * | 3/2005 | Alivisatos et al. | 435/7.1 |
| 2005/0067490 | A1 * | 3/2005 | Fletcher | 235/383 |
| 2005/0080512 | A1 * | 4/2005 | Critchlow | 700/245 |
| 2005/0083796 | A1 * | 4/2005 | Gold | 369/30.27 |
| 2005/0125575 | A1 * | 6/2005 | Alappat et al. | 710/41 |
| 2005/0140498 | A1 * | 6/2005 | Bastian, II | 340/5.92 |
| 2005/0149231 | A1 * | 7/2005 | Pretlove et al. | 700/264 |
| 2005/0169126 | A1 * | 8/2005 | Wakelin et al. | 369/30.38 |
| 2005/0190660 | A1 * | 9/2005 | Wakelin et al. | 369/30.27 |
| 2005/0230470 | A1 * | 10/2005 | Hoshino | 235/375 |
| 2006/0124513 | A1 * | 6/2006 | McLaughlin et al. | 209/584 |
| 2006/0155592 | A1 * | 7/2006 | Burkert et al. | 705/7 |
| 2006/0190130 | A1 * | 8/2006 | Fedor et al. | 700/236 |
| 2006/0259377 | A1 * | 11/2006 | Fedor et al. | 705/28 |
| 2007/0106697 | A1 * | 5/2007 | Amarendran et al. | 707/104.1 |
| 2007/0140525 | A1 * | 6/2007 | Kottomtharayil | 382/103 |
| 2007/0150092 | A1 * | 6/2007 | Ohmura et al. | 700/231 |
| 2007/0162183 | A1 * | 7/2007 | Pinney et al. | 700/236 |
| 2007/0179666 | A1 | 8/2007 | Bain | |
| 2007/0203811 | A1 * | 8/2007 | Hoopes et al. | 705/28 |
| 2007/0235516 | A1 * | 10/2007 | Georgis et al. | 235/375 |
| 2007/0293982 | A1 * | 12/2007 | Rosenblum | 700/235 |
| 2008/0029601 | A1 * | 2/2008 | Clarke et al. | 235/462.01 |
| 2008/0188063 | A1 * | 8/2008 | Alivisatos et al. | 438/483 |
| 2008/0248587 | A1 * | 10/2008 | Lagwinski et al. | 436/172 |
| 2008/0259817 | A1 * | 10/2008 | Jeansonne et al. | 370/254 |
| 2008/0269947 | A1 * | 10/2008 | Beane et al. | 700/237 |
| 2009/0014458 | A1 * | 1/2009 | Heffron | 221/2 |
| 2009/0048712 | A1 * | 2/2009 | Rosenblum | 700/242 |
| 2009/0055018 | A1 * | 2/2009 | Meek et al. | 700/237 |
| 2009/0166415 | A1 * | 7/2009 | Braun et al. | 235/385 |
| 2009/0187274 | A1 * | 7/2009 | Higham | 700/237 |
| 2009/0222359 | A1 * | 9/2009 | Henry | 705/28 |
| 2010/0070070 | A1 * | 3/2010 | Stemmle | 700/215 |
| 2010/0073184 | A1 * | 3/2010 | Lehmann et al. | 340/679 |
| 2010/0198401 | A1 * | 8/2010 | Waugh et al. | 700/237 |

* cited by examiner

METHODS, SYSTEMS, AND APPARATUS FOR DETERMINING AND AUTOMATICALLY PROGRAMMING NETWORK ADDRESSES FOR DEVICES OPERATING IN A NETWORK

CROSS-REFERENCE TO RELATED APPLICATIONS

The present application claims priority from U.S. Provisional Patent Application Ser. No. 61/145,772, filed Jan. 20, 2009 and entitled Method And Apparatus For Optically Determining And Automatically Programming The Network Address For Devices Operating In A Network, the disclosure of which is incorporated by reference herein in its entirety.

FIELD

The present invention is generally directed to network communication, and more specifically is directed to the configuration of network devices used in the automated dispensing of pharmaceuticals and related methods and apparatus.

BACKGROUND

Pharmacy generally began with the compounding of medicines, which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate portions of the pharmacy environment. In a typical automated pharmacy machine, bins store individual prescriptions or groups of prescriptions that have been filled by a pharmacy. A bin holding a prescription is accessible to a customer for pick-up only after the customer identifies him/herself (typically via an input keypad or the like) as someone with authority to pick up the prescription. Exemplary automated pharmacy machines are described in U.S. Patent Publication No. 2007-0179666 to Bain and U.S. Pat. No. 7,228,200 to Baker et al., the disclosures of each of which are hereby incorporated herein in its entirety.

Configuring the various elements of an automated pharmacy machine after initial assembly of the machine may be time-consuming. For example, an automated pharmacy machine may include a plurality of optical sensors or scanners for scanning the prescriptions or other packages stored in each of its bins. As such, after mounting the scanners within the automated pharmacy machine, human intervention may be required to inform a network controller where each scanner is located in the automated pharmacy machine, for instance, by populating a look-up table. In addition, manual configuration of a mechanical device, such as a dipswitch or jumper, may be required to assign a network address to each scanner. However, such manual configuration methods may introduce the potential for errors and/or additional costs. For example, an installer may assign a scanner with an incorrect network address, and/or may inadvertently assign two scanners with the same address.

SUMMARY

According to some embodiments of the present invention, a method for configuring a network device including an optical sensor includes activating the optical sensor of the network device to generate data representing an image in view thereof, and analyzing the data from the optical sensor to determine image information represented by the image. A network address is automatically assigned to the network device based on the image information represented by the image in view of the optical sensor.

In some embodiments, the image information may be an alphabetic and/or numeric character string. The network address may be automatically assigned by automatically generating the network address for the network device from the character string using a predetermined algorithm, and automatically storing the network address in a memory of the network device.

In some embodiments, the image in view of the optical sensor may be a barcode representing the character string.

In some embodiments, the network device may be one of a plurality of communicatively coupled nodes in a system, and the character string may indicate a physical location in the system.

In some embodiments, the system may include a matrix having a plurality of rows and columns. The character string may identify a row and/or a column in the matrix corresponding to the physical location of the image in the system.

In some embodiments, the network address for the network device may be generated by extracting at least one alphabetic and/or numeric character from the character string, and generating the network address to include a representation of the at least one alphabetic and/or numeric character. Accordingly, the network address of the network device may indicate the physical location of the image in view of the optical sensor thereof.

In some embodiments, the plurality of nodes may be arranged in a same row of the matrix. The character string may include an alphabetic character that identifies a column of the matrix corresponding to a physical location of the network device.

In some embodiments, the system may be an automated pharmaceutical dispensing apparatus including a plurality of bins configured to store filled prescriptions therein. The plurality of bins may be arranged along the rows and columns of the matrix, and each of the plurality of bins may include a respective barcode affixed thereto. The image in view of the optical sensor may be one of the respective barcodes, and the character string represented by the one of the respective barcodes may identify the row and/or column of one of the plurality of bins to which the barcode is affixed.

In some embodiments, the network address may be one of a predetermined set of network addresses generated using the predetermined algorithm. An activation command may be transmitted from a network controller to the plurality of nodes in the system based on the predetermined set of network addresses, and the optical sensor of the network device may be activated in response to the activation command.

In some embodiments, the network address assigned to the network device may be associated with the physical location in the system indicated by the character string. Then, a command may be selectively transmitted from the network controller to the network device among the plurality of nodes to activate the optical sensor thereof to identify an item in view thereof at the corresponding physical location.

According to further embodiments of the present invention, a system includes a plurality of communicatively coupled network devices. The network devices respectively include an optical sensor that is operable to generate data representing a respective image in view thereof, and a processor that is operable to activate the optical sensor, analyze the data to derive respective image information therefrom, and automatically assign a respective network address to its corresponding network device based on the respective image information represented by the respective image in view of the optical sensor.

According to still further embodiments of the present invention, an automated pharmaceutical dispensing apparatus includes a plurality of bins configured to store filled prescriptions therein, and a plurality of communicatively coupled scanners. The bins include respective barcodes affixed thereto. The scanners respectively include an optical sensor that is operable to generate data representing a respective barcode in view thereof, and circuitry that is operable to activate the optical sensor, analyze the respective data to determine respective image information represented by the respective barcode, and automatically assign a respective network address to its corresponding scanner based on the image information represented by the respective barcode in view of the optical sensor.

According to yet further embodiments of the present invention, a network device includes an optical sensor operable to generate data representative of an image in view thereof, and a circuit coupled to the optical sensor. The circuit is operable to activate the optical sensor to generate the data, analyze the data to determine image information represented by the image, and automatically assign a network address to the network device based on the image information represented by the image.

According to some embodiments of the present invention, a method for configuring a network device having a sensor therein includes activating the sensor of the network device to receive data, analyzing the data from the sensor to determine physical location information represented thereby, and automatically assigning a network address to the network device based on the physical location information indicated by the data from the sensor. For example, the sensor may be a radio frequency identification (RFID) reader or receiver, and the data may be received from an RFID tag affixed to the physical location in a system.

Although described above primarily with respect to method, system, and device aspects of the present invention, it will be understood that the present invention may also be embodied as computer program products. Also, other network devices, methods, systems, and/or computer program products according to embodiments of the invention will be or become apparent to one with skill in the art upon review of the following drawings and detailed description. It is intended that all such additional electronic devices, methods, and/or computer program products, as well as any and all combinations of the above embodiments, be included within this description, be within the scope of the present invention, and be protected by the accompanying claims.

DETAILED DESCRIPTION OF EMBODIMENTS

Figure 1:
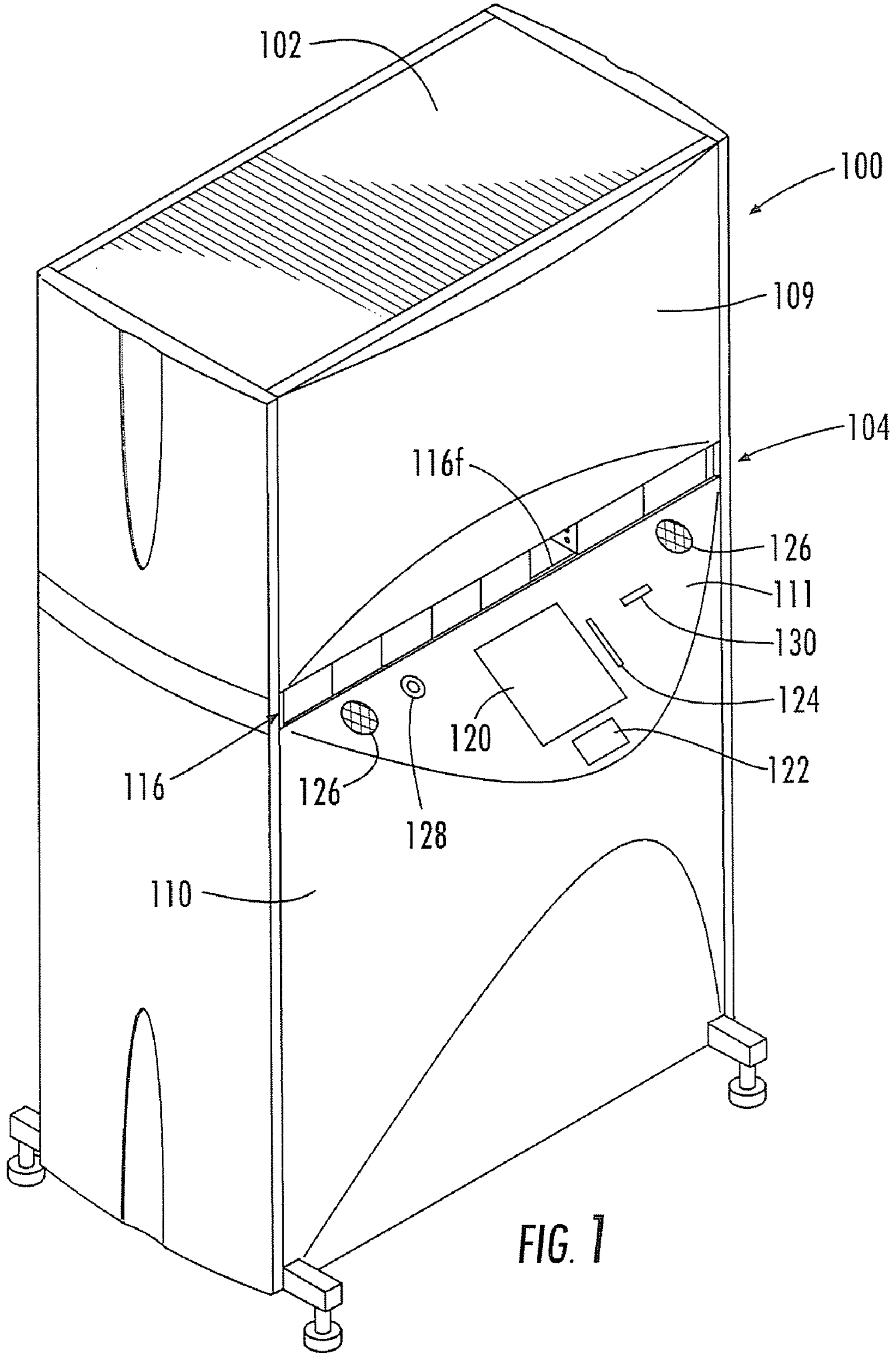
FIG. 1 is front perspective view depicting an automated pharmacy machine including network devices according to some embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein the expression "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Where used, the terms "attached", "connected", "interconnected", "contacting", "mounted," "coupled" and the like can mean either direct or indirect attachment or contact between elements, unless stated otherwise. In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, although the terms first, second, etc. may be used herein to describe various elements, these elements should not be limited by these terms. These terms are only used to distinguish one element from another. For example, a first scanner, bin, or node could be termed a second scanner, bin, or node, and, similarly, a second scanner, bin, or node could be termed a first scanner, bin, or node without departing from the teachings of the disclosure.

Well-known functions or constructions may not be described in detail for brevity and/or clarity.

In a system of network devices that collects information about its surroundings, the physical location of each network device may set the context for interpreting the information it collects. As an example, a network of three barcode scanners having the network addresses X, Y and Z may serve conveyor belts A, B and C, respectively. When a scanner scans a package and returns a barcode value of 3, an association between the location of the scanner and the value 3 may be necessary to determine the location of the package in the system. Moreover, to determine which package was on conveyor B, a means of directly addressing the scanner on conveyor B may be required. This process may thereby require an association between the physical address (B) of the conveyor belt and the logical network address (Y) of the scanner. Having made this association, a message may be sent to scanner Y requesting a scan of the barcode affixed to the package in view (e.g., the package on conveyor B).

Accordingly, embodiments of the present invention provide systems, methods, and computer program products for automatically determining the physical locations of a plurality of network devices and assigning addresses to the network devices based on the physical locations thereof. In particular, some embodiments of the present invention provide a system for optically determining and automatically assigning network addresses for the plurality of network devices without human intervention. The system includes a network of communicatively coupled network devices (also referred to herein as "nodes"). Each network node contains an optical sensor (such as a barcode reader), a processor, and the firmware for operation. Based on data from the optical sensor, each network node may be automatically programmed with a unique network address, which may be subsequently used for communication with the node. In particular embodiments, a barcode is mounted within view of a barcode scanner attached to each network node. Each barcode is encoded with data that is unique and identifies the barcode's physical location in the system. Each node uses its barcode scanner to scan the associated barcode. The node applies an algorithm to the data encoded in the barcode, yielding the physical location information. The node may then automatically generate its network address based on this physical location and store its network address in a read-only memory (ROM) or other memory of the network node.

Figure 2:
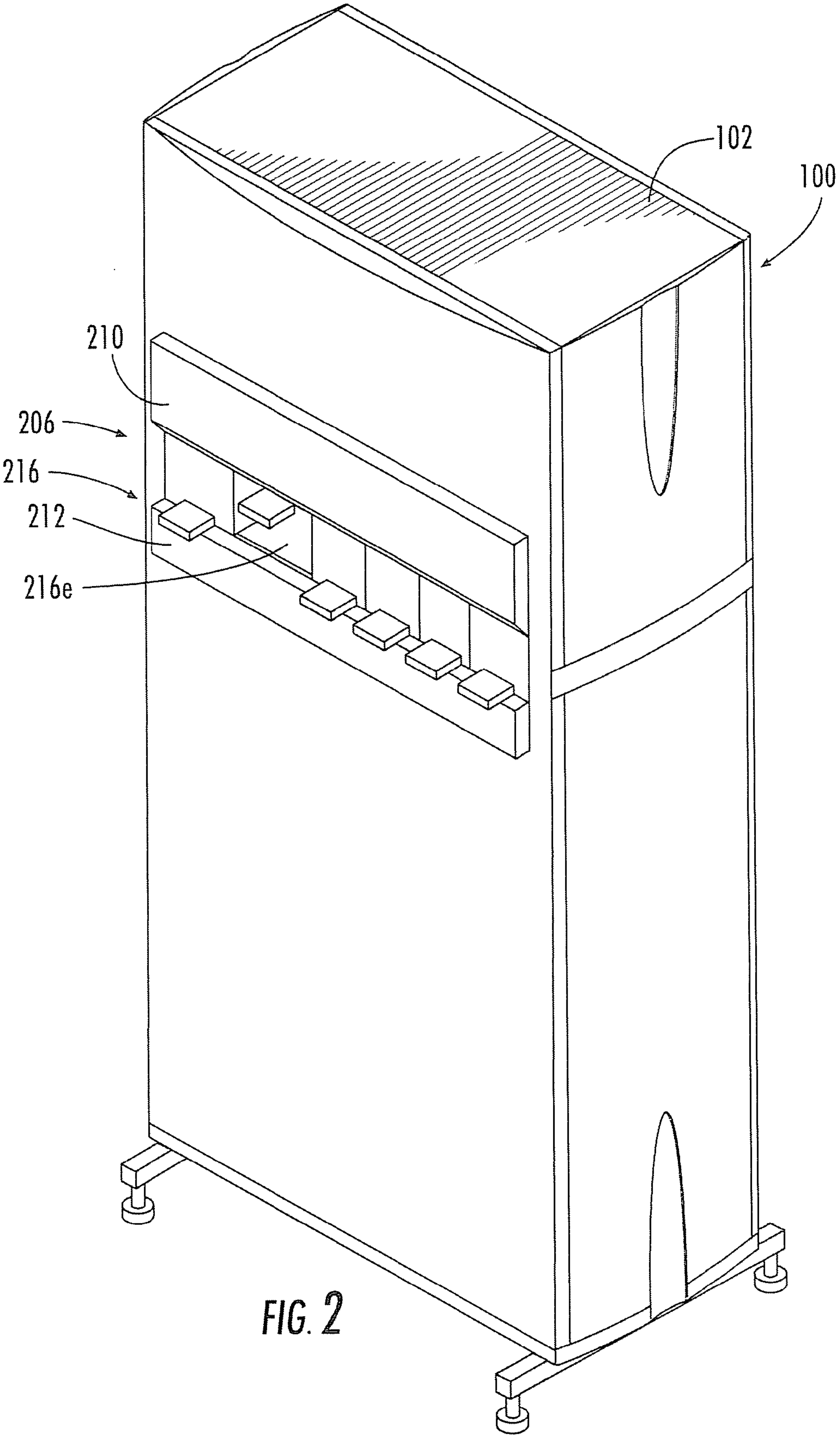
FIG. 2 is rear perspective view depicting the automated pharmacy machine of FIG. 1.

Embodiments of the present invention may be used, for example, in an automated pharmaceutical dispensing apparatus, such as an automated pharmacy machine. FIGS. 1 and 2 illustrate an automated pharmaceutical dispensing apparatus 100 having a housing, enclosure, or cabinet ("housing") 102, which is constructed so that the interior of the apparatus 100 may be accessed by a user or consumer through a dispensing station 104 on the housing, and by authorized vending personnel through a loading station 206. The loading station 206 is illustrated by way of example as being located on a side of the housing 102 opposite the dispensing station 104. The loading station 206 includes a first raised cover 210, a second raised cover 212 disposed beneath the cover 210, and an array 216 of locked or closed doors situated between the covers 210 and 212. In FIG. 2, one door 216*e* of the loading station 206 is shown in the open position.

As shown in FIG. 1, the dispensing station 104 is positioned between a first shaped panel 109 and a second shaped panel 110. The second shaped panel has a surface 111 bordering the dispensing station. The surface 111 which borders the dispensing station 104 is a control panel that provides access to interface instruments for conducting a transaction. These instruments may include, for example, a touch screen panel 120, a signature pad 122, a magnetic stripe (card) reader 124, speakers 126, a camera 128, and a receipt slot 130. However, in some embodiments, the control panel may provide access to fewer or more instruments than those shown. The dispensing station 104 may further include an array 116 of locked or closed doors. The doors of the dispensing station 104 may be unlocked and opened (as shown by door 116f) to provide access to a product or package (such as a filled prescription) that is contained in a bin behind the door in response to a successful transaction. The apparatus 100 may thereby "dispense" a product or package, such as a filled prescription, by providing access to the bin via the door, allowing the product or package to be retrieved by or for a recipient.

Figure 3:
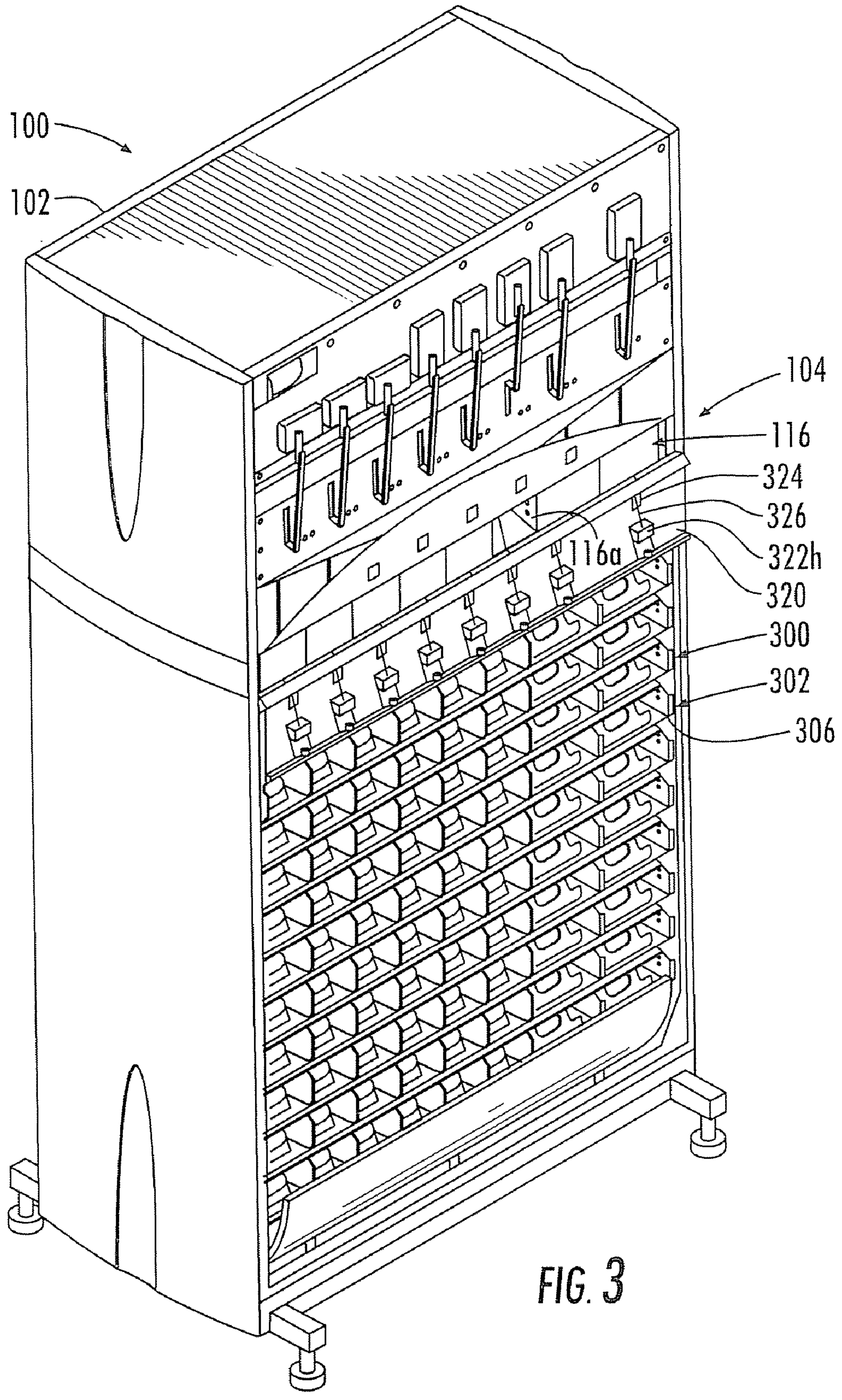
FIG. 3 is front perspective view depicting the automated pharmacy machine of FIG. 1 with the front cover removed to show details of the bins and network devices according to some embodiments of the present invention included therein.
Figure 4:
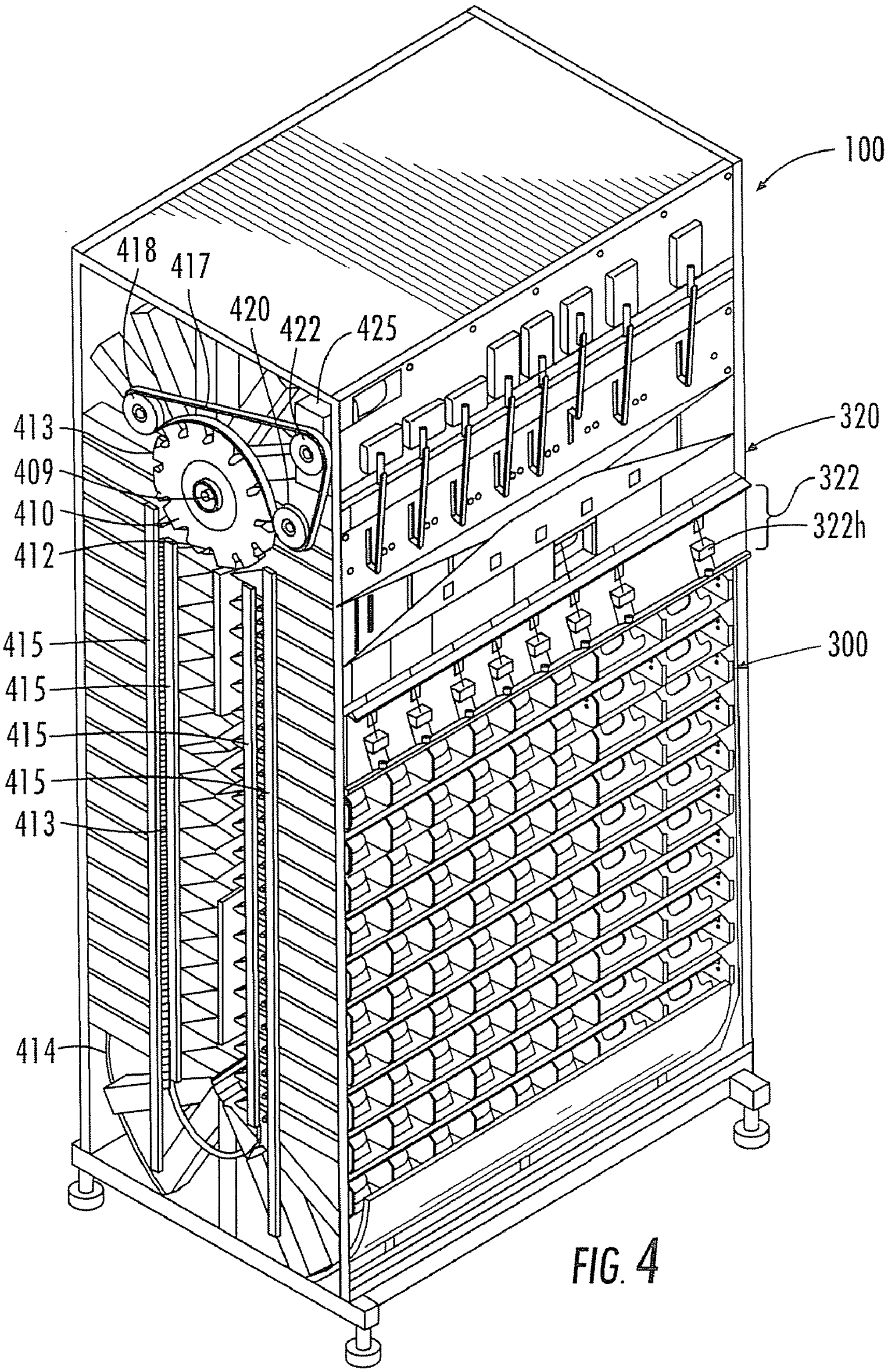
FIG. 4 is front perspective view depicting the automated pharmacy machine of FIG. 1 with the front and side covers removed to show further details of the bins and network devices according to some embodiments of the present invention included therein.
Figure 5:
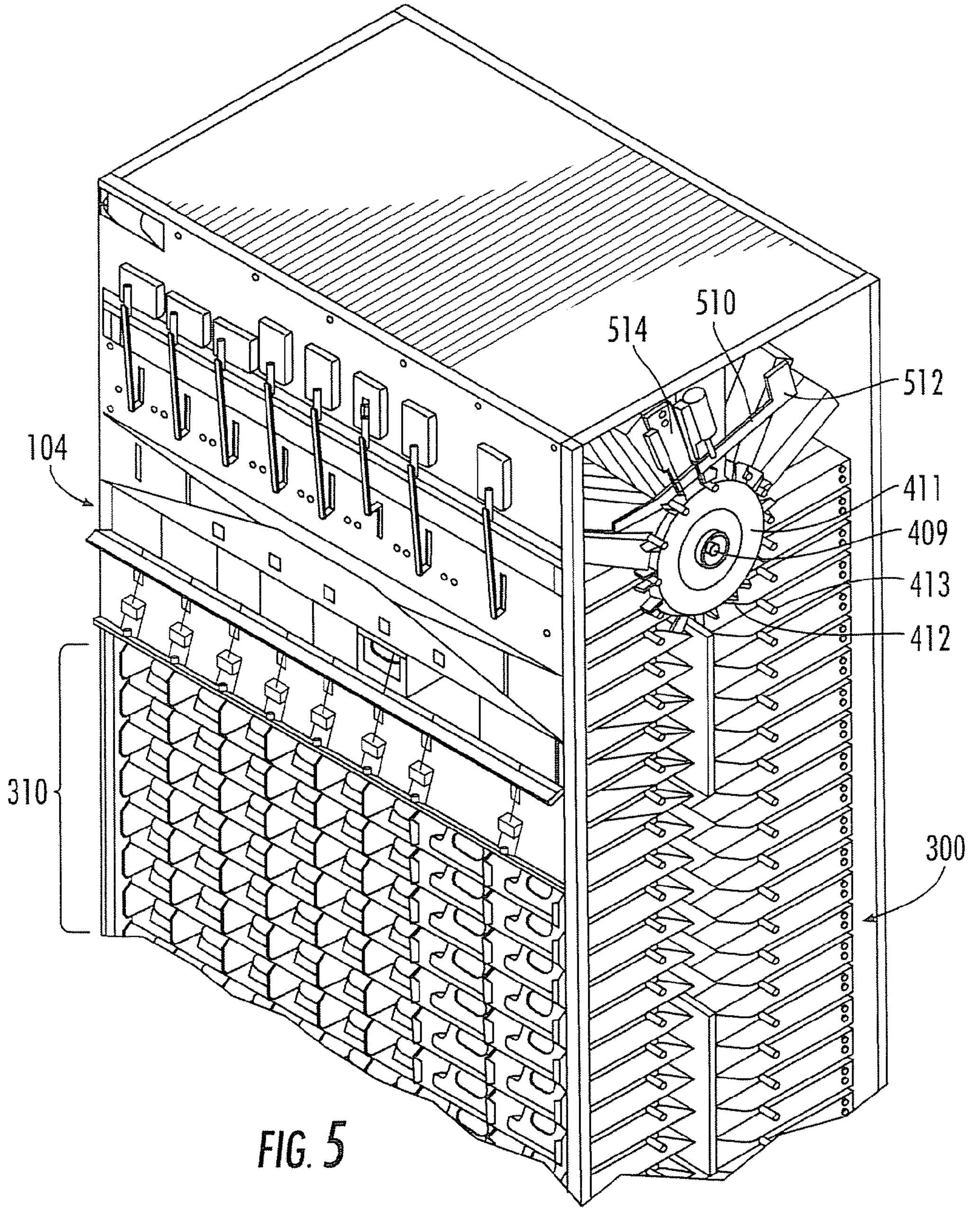
FIG. 5 is front perspective view depicting an opposite side of the automated pharmacy machine of FIG. 1 with the front and side covers removed to show further details of the bins and network devices according to some embodiments of the present invention included therein.

FIGS. 3, 4, and 5 illustrate the apparatus 100 of FIGS. 1 and 2 with panels of the housing 102 removed to reveal a mechanism including a plurality of linked bins 306 forming a two-dimensional matrix 310 that may be moved or transposed in either vertical direction. The bins 306 in the apparatus 100 are assembled into a plurality of 1×n bin arrays, and then into a matrix 310, where each array 302 provides a row of the matrix 310. In this example, the rows of the matrix 310 are linked together to form a continuous chain of bins 300. Alternatively, at least one link may be omitted, making the chain 300 discontinuous. The bins 306 of each bin array 302 may have the same or different widths. The bin arrays 302 may be made of sheet metal or molded plastic in some embodiments.

The chain of bins 300 is moved by a mechanism in the housing 102 including at least one axle 409 and a pair of hubs mounted to the axle at each of its ends. One hub of the axle 409 is indicated by reference numeral 410, the other by 411. The hubs 410 and 411 of the axle 409 are supported for rotation in bearings (not shown) in the side panels of the housing 102. The hubs 410 and 411 include sprockets in their respective rims. A sprocket in each hub rim is indicated by reference numeral 412. The chain 300 is received over the hubs 410 and 411 in the upper end of the housing 102, with cylindrical retainers 413 at the ends of rods which link the bins together engaged by the sprockets 412. In the lower end of the housing, a semicircular chute 414 made of low friction material such as Teflon is held against the chain 300 in order to guide the chain as it rotates against the chute 414 and retain contents of the bins in the bins as the chain 300 rotates through a bottom arc. Alternatively, a sheet of low friction material can be tensioned against the chain 300 in the lower end of the housing 102. Other means for retaining the contents of the bins in the bins through the bottom arc include wire springs in the bins or belts outside the bins. Two pairs of guides 415 secured to each of the side panels of the housing 102 form channels which receive the cylindrical retainers 413 and stabilize the chain as it is moved or transposed in the housing 102. The chain 300 is moved in either vertical direction by a drive mechanism including a belt 417 that engages the hub 410 that is visible in FIG. 4. The belt 417 is tensioned over the rim of the hub 410 and over rollers 418 and 420, and engages the output hub 422 of a reversible electric motor 425. When the chain 300 is stopped, it is retained in place by a retainer mechanism shown in FIG. 5. The retainer mechanism includes a lock arm 510 rotatably secured at 512 to a side panel (not shown) of the housing 102. The arm 510 engages the sprockets 412 on the rim of the hub 411. A solenoid 514 moves the arm 510 toward and away from the rim of the hub 411.

Figure 6:
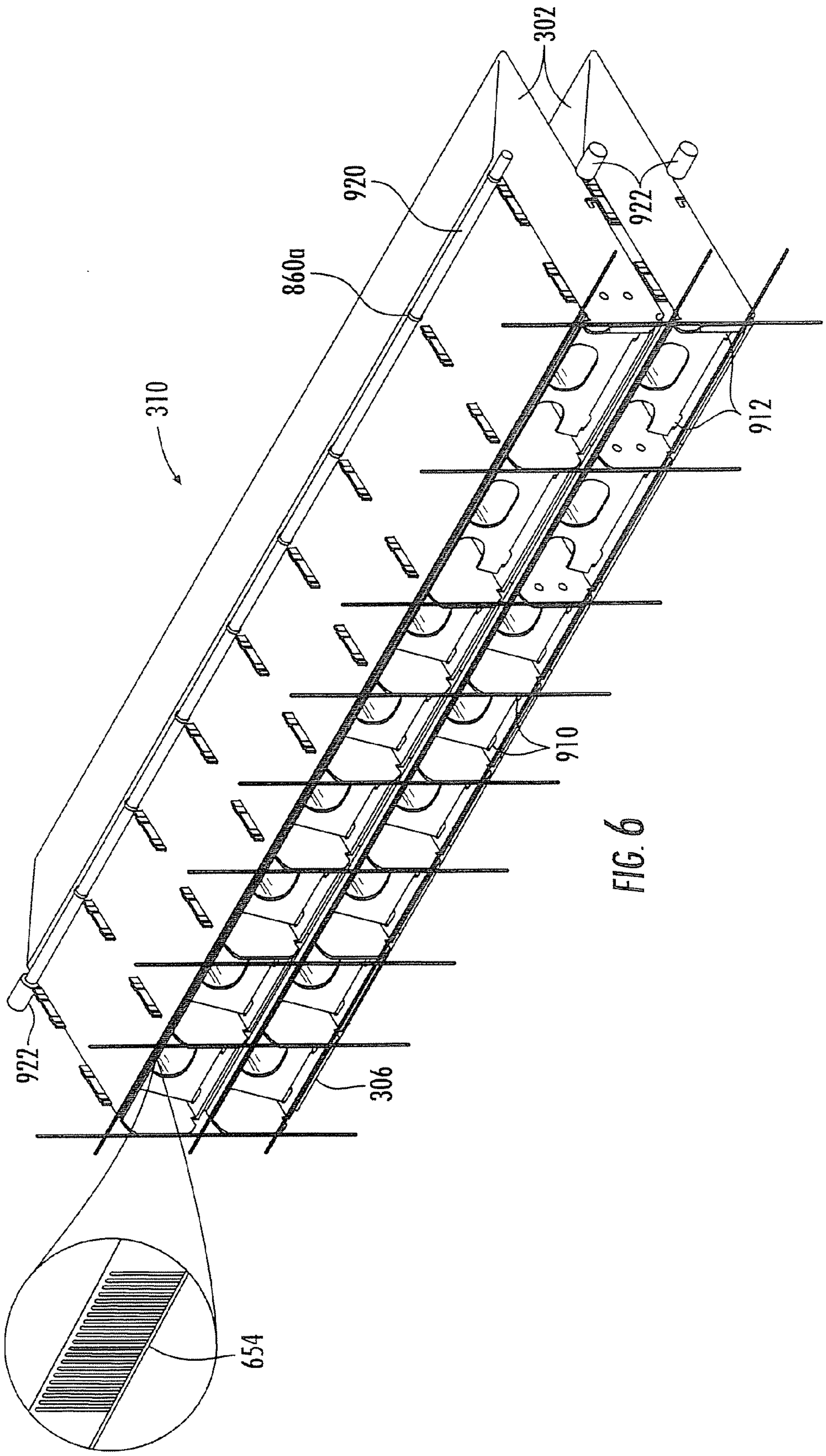
FIG. 6 is an enlarged perspective view illustrating a matrix including a plurality of bins according to some embodiments of the present invention.

FIG. 6 illustrates a portion of the matrix 310 including two bin arrays 302 in greater detail. The two-dimensional matrix 310 may be visualized by removing one link of the chain of bins 300, and laying the chain of bins 300 flat on a supporting surface. As such, each bin array 302 corresponds to a respective row in the matrix 310, and each bin 306 corresponds to a respective column of the matrix 310. The darkened lines in FIG. 6 highlight the rows and columns of the matrix 310. The physical location of each bin 306 in the matrix 310 may therefore be uniquely identified by its row and column designator, e.g., by an identifier BIN (m, n). In some embodiments, a two-digit numeric portion (e.g., "01" to "99") may be used to designate the rows of the matrix 310, and a single alphabetic character (e.g., "A" to "Z") may be used to designate the columns of the matrix 310. For example, the matrix 310 may include m rows and n columns, where 2 rows (e.g., rows "01" and "02") and columns (e.g., columns "A" to "H") are illustrated in FIG. 6. However, the matrix 310 may include fewer or greater rows and/or columns of bins 306 in some embodiments.

As shown in FIG. 6, each side of a bin array 302 has a plurality of coupling eyelets 860*a* disposed in two elongate alignments in alignment with the edge where the bins transition to their closed, tapered ends. The coupling eyelets 860*a* on one side of a bin array are aligned with a coupling eyelet alignment on an adjacent bin array and joined by rods 920 so that the bin arrays 302 are linked to form the matrix 310. The rods are retained in the eyelets by cylindrical retainers 922 secured to the ends of the rods. The tapered ends of the bins permit those ends to be moved together and apart as the chain 300 travels around the axles at each end of the housing.

Still referring to FIG. 6, each bin 306 includes a barcode 654 or other unique visual identifier affixed or otherwise provided along an upper edge or other surface thereof to identify that bin to a central network controller. As used herein, a "barcode" may generally refer to any optical representation of data that may be detected and interpreted by a machine. For example, the barcodes 654 may represent data based on the widths and/or spacings of a plurality of parallel lines, which may be referred to as linear or 1D (1-dimensional) barcodes or symbologies. The barcodes 654 may also represent data using squares, dots, hexagons and other geometric patterns within images, which may be termed 2D (2-dimensional) matrix codes or symbologies. The barcodes 654 can be read, captured, analyzed, and/or interpreted by an optical sensor, such as the optical sensors 395*a* to 395*h* described below. Each barcode 654 represents a unique character string. The character string may indicate a physical location of the barcode 654 (and consequently, the physical location of the bin 306 to which it is affixed) in the matrix 310. For example, the row and column identifier for each bin 306 may be encoded as an alphabetic and/or numeric character string in the barcode 654 that is affixed thereto. In some embodiments, each barcode 654 may represent the two-digit numeric portion identifying the row (e.g., "01" to "99") and the single alphabetic character identifying the column (e.g., "A" to "Z") of the bin 306 to which it is affixed. The column and row characters may be concatenated to provide the barcode. For example, a bin 306 located in the $23^{rd}$ row and the $5^{th}$ column (represented by the letter "E") may be labeled with a barcode representing the character string "E23." As such, the physical location information represented by the barcodes 654 may be used to generate network addresses for network devices, as discussed below.

Referring again to FIGS. 3, 4 and 5, elements of the dispensing station 104 that are not visible in FIGS. 1 and 2 include panel 320 with raised elongate edges secured to the frame of the housing 102. The panel 320 extends across the width of the housing 102 adjacent the dispensing location. An array 322 of network devices 322*a* to 322*h* is supported on the panel 320 to sense or read information in the bins 306. Each of the network devices 322*a* to 322*h* includes an optical sensor therein. Each of the network devices 322*a* to 322*h* is illustrated as being positioned along a different column of the matrix 310 by way of example: as such, it will be understood that the panel 320 may extend along a length of the housing 102 and the network devices 322*a* to 322*h* may each be positioned along a different row of the matrix 310 in some embodiments where the apparatus 100 is configured such that the chain of bins 300 is moved in either horizontal direction. The optical sensors may include charge-coupled device (CCD) image sensors, CMOS Image Sensors (CIS), barcode readers, cameras, and/or other sensors that are operable to detect and/or capture visible images and translate the images into electrical signals or data representative thereof. Each of the sensors of the network devices 322*a* to 322*h* has a line of sight to a respective bin 306 by an aperture through the panel 320. The aperture for the network device 322*h* is indicated by reference numeral 324, and its line of sight is indicated by 326.

Figure 7:
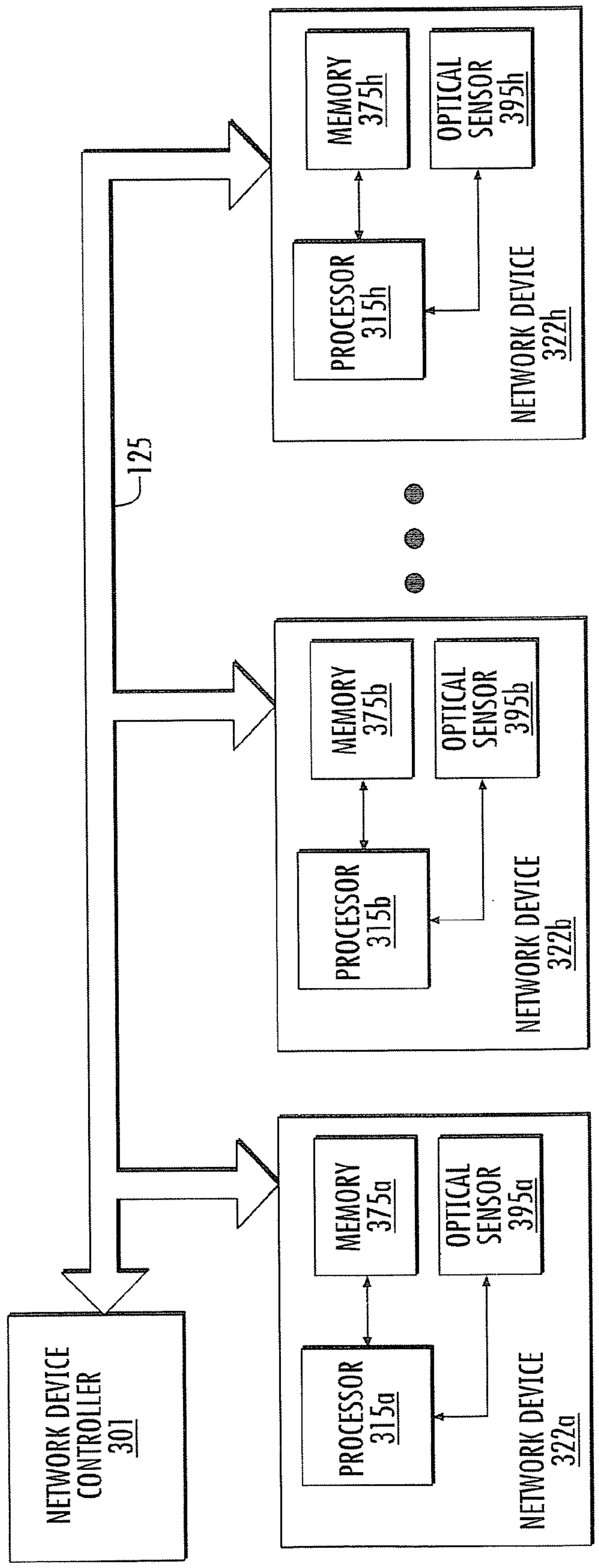
FIG. 7 is a schematic block diagram illustrating network devices according to some embodiments of the present invention in greater detail.
Figure 8:
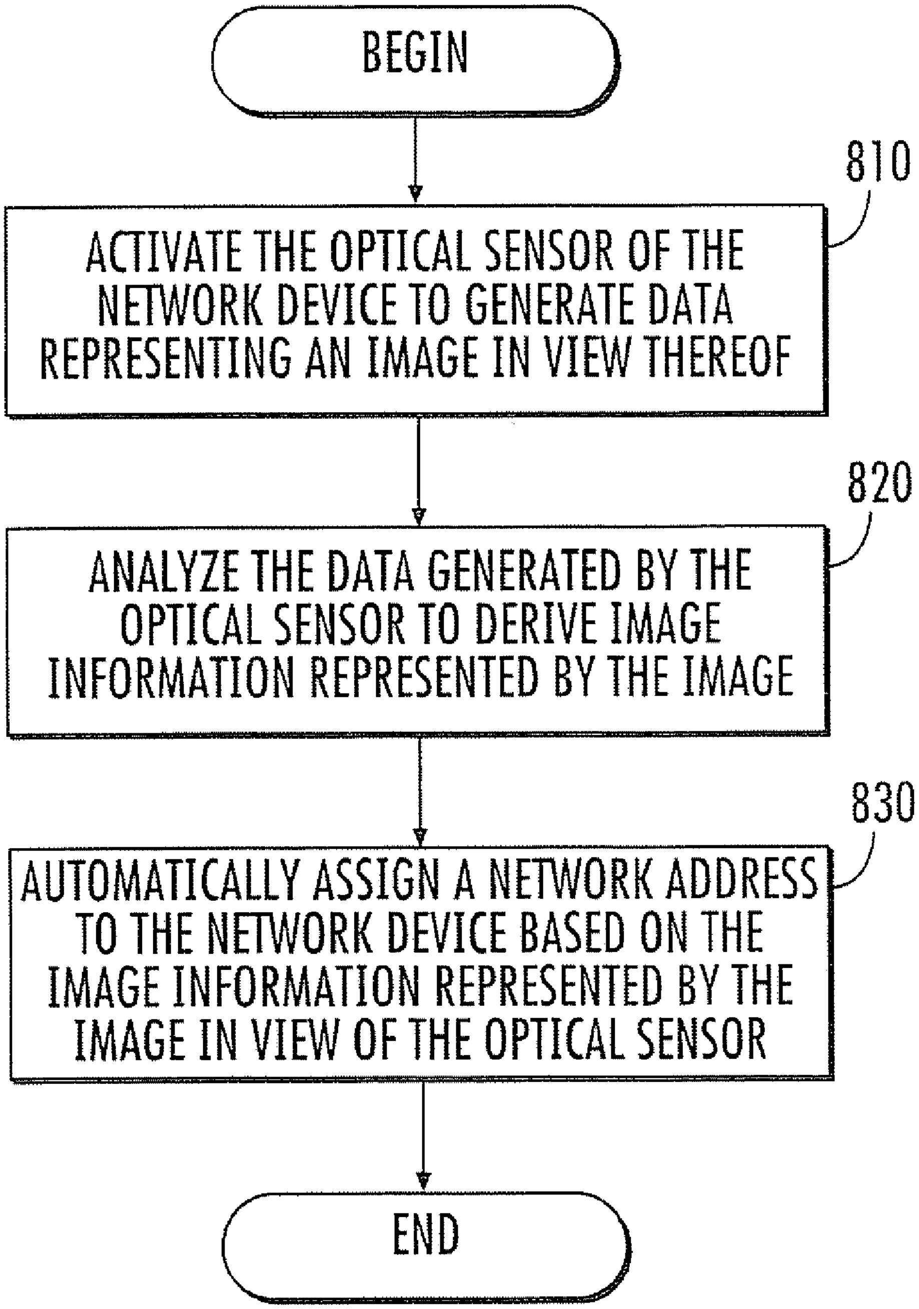
FIG. 8 is a flowchart illustrating example operations performed by each of the network devices of FIG. 7.

FIG. 7 is a schematic block diagram illustrating the network devices or nodes 322*a* to 322*h* in greater detail, while FIG. 8 is a flowchart illustrating example operations that may be performed by each of the network devices of FIG. 7. As shown in FIG. 7, the network devices 322*a* to 322*h* include processors 315*a* to 315h, memory units 375*a* to 375*h*, and optical sensors 395*a* to 395*h*, respectively. Each of the network devices 322*a* to 322*h*, including the optical sensor, processor, and memory, may also be referred to herein as a "scanner." The network devices 322*a* to 322*h* are communicatively coupled to a network device controller 301 by a bus 125. The network device controller 301 may be a central controller configured to control the operations of the entire apparatus 100 in some embodiments, or may be communicatively coupled to such a central controller for the apparatus 100 in other embodiments. The processors 315*a* to 315*h* may be, for example, commercially available or custom microprocessors or other circuitry configured to coordinate and manage operations of the memory units 375*a* to 375*h* and/or the optical sensors 395*a* to 395*h*, respectively. The memory units 375*a* to 375*h* may represent a hierarchy of memory that may include volatile and/or nonvolatile memory, such as flash, magnetic, and/or optical rewritable nonvolatile memory, and may be configured to store the firmware and/or the network addresses of the network devices 322*a* to 322*h*, respectively. The optical sensors 395*a* to 395*h* are operable to capture an image and/or generate a signal or data representative of an image in view thereof.

Each of the network devices 322*a* to 322*h* is configured to automatically assign and program itself with a unique network address based on the information received from its corresponding optical sensor 395*a* to 395*h*. In particular, with reference to FIG. 8, one or more of the processors 315*a* to 315*h* may activate the corresponding optical sensor(s) 395*a* to 395*h* to detect, scan, capture, and/or generate data representing an image in view thereof (Block 810). For example, a different barcode 654 may be in view of each of the optical sensors 395*a* to 395*h*, where each barcode represents a different alphabetic and/or numeric character string. The processors 315*a* to 315*h* may analyze or decode the respective data from the corresponding optical sensors 395*a* to 395*h* to derive image information represented by the respective images (Block 820). In the above example, the processors 315*a* to 315*h* may decode the respective data to determine the alphabetic and/or numeric character strings represented by the barcodes 654. As such, each of the processors 315*a* to 315*h* may assign a respective network address to its corresponding network device 322*a* to 322*h* based on the image information derived from the data provided by its corresponding optical sensor 395*a* to 395*h* (Block 830). The assigned network addresses may be stored in the respective memory units 375*a* to 375*h* of the devices 322*a* to 322*h*.

The images provided in view of each of the optical sensors 395*a* to 395*h* are selected such that each processor 315*a* to 315*h* will generate and assign a different network address to each network device 322*a* to 322*h*. In addition, the processors 315*a* to 315*h* may be configured to generate the respective network addresses using a predetermined algorithm. For example, in embodiments where the respective positions of the network devices 322*a* to 322*h* in the array 322 correspond to the columns of the matrix 310, the processors 315*a* to 315*h* may extract the column designator (e.g., “A” to “H” in the above example) from each character string and generate the network addresses for the devices 322*a* to 322*h* to include the corresponding column designator. In other words, the physical locations of the network devices 322*a* to 322*h* may be determined from the scanned images, and the network addresses for the devices 322*a* to 322*h* may be assigned based on their physical locations. As such, the logical addresses of the network devices 322*a* to 322*h* may reflect the physical locations of the network devices 322*a* to 322*h* in the matrix 310.

The network device controller 301 is aware of the character string represented by the barcode 654 affixed to each of the bins 306, and thus, uses the same algorithm to predetermine the set of network addresses that will be generated by the network devices 322*a* to 322*h*. For example, the network device controller 301 may retain the bin identifier for each bin 306 as an ordered table, list, map, tree, or other equivalent structure, and may easily and quickly scan such a structure to retrieve the bin identifier for a particular bin and generate its network address using the predetermined algorithm. The data structure may also relate the present location of each row of bins relative to the dispensing and loading stations to track the bin arrays currently positioned at or moving past the stations, and further, to relate each door of the array 116 to a specific one of the bins 306 positioned adjacent thereto.

The network device controller 301 may thereby associate the network addresses assigned to the network devices 322*a* to 322*h* with their respective physical locations in the apparatus 100 indicated by the character string. The network device controller 301 may also initiate the process of generating and assigning the network addresses to each of the network devices 322*a* to 322*h* by broadcasting an activation command to all of the network devices 322*a* to 322*h* using the predetermined set of network addresses, thereby instructing the network devices 322*a* to 322*h* to activate their respective optical sensors 395*a* to 395*h* to scan or capture the respective barcodes 654 on the bins 306 in view thereof.

Accordingly, once the apparatus 100 has been assembled and the network devices 322*a* to 322*h* have been attached, the network devices 322*a* to 322*h* receive a broadcast command from the network controller 301. This command causes each network device 322*a* to 322*h* to establish a network address by scanning the barcode 654 in view thereof, extracting the alphabetic column designator from the barcode data, and storing the alphabetic character in its memory 375*a* to 375*h*. Since network addresses and column locations may have a one-to-one relationship and barcode alphabetic characters may be unique to the column, the alphabetic character(s) from the barcode may be used as the respective network addressees for the network devices 322*a* to 322*h*.

Figure 9:
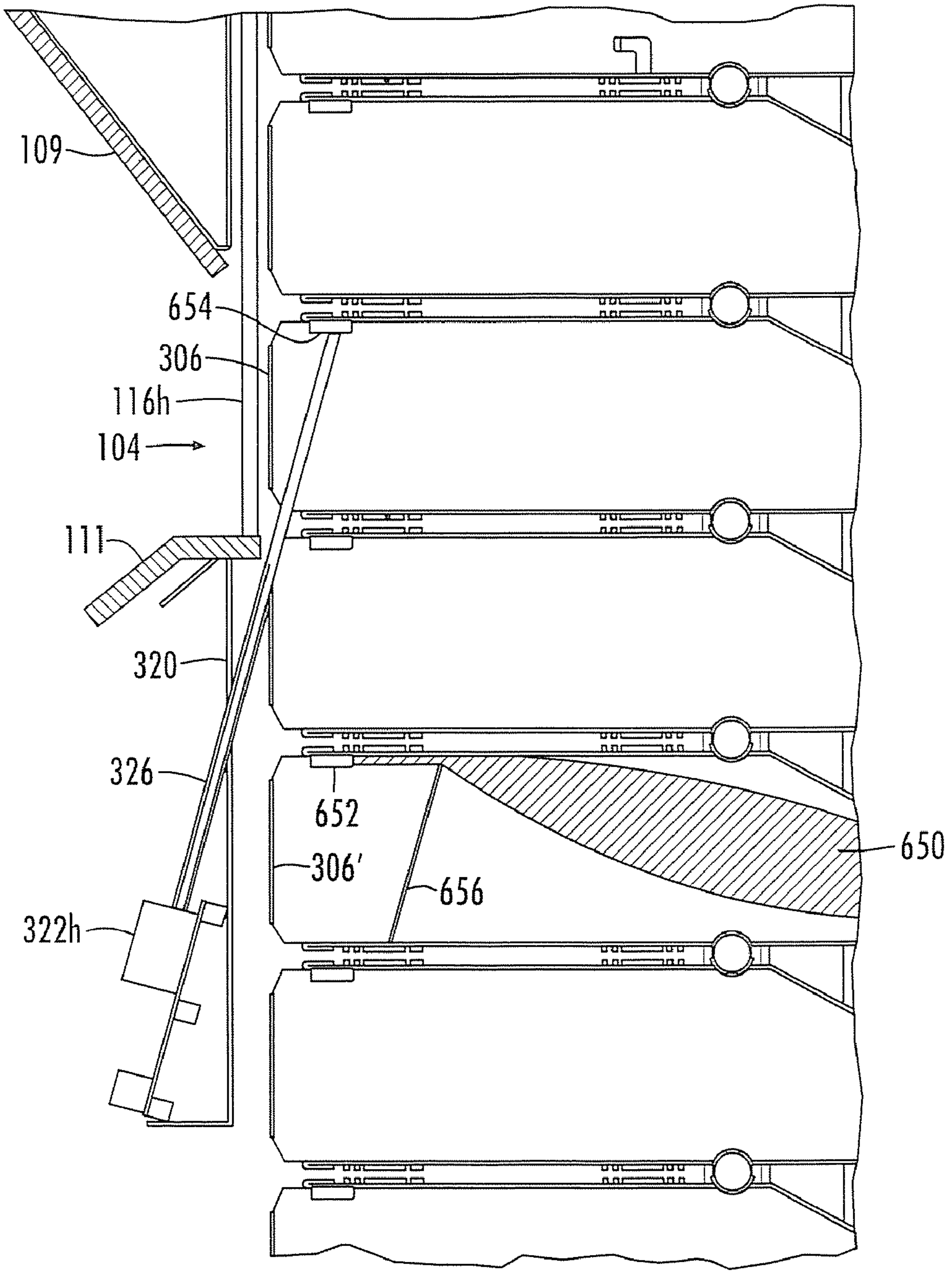
FIG. 9 is a partial cross-sectional view illustrating one column of bins of the automated pharmacy machine of FIGS. 1-5.
Figure 10:
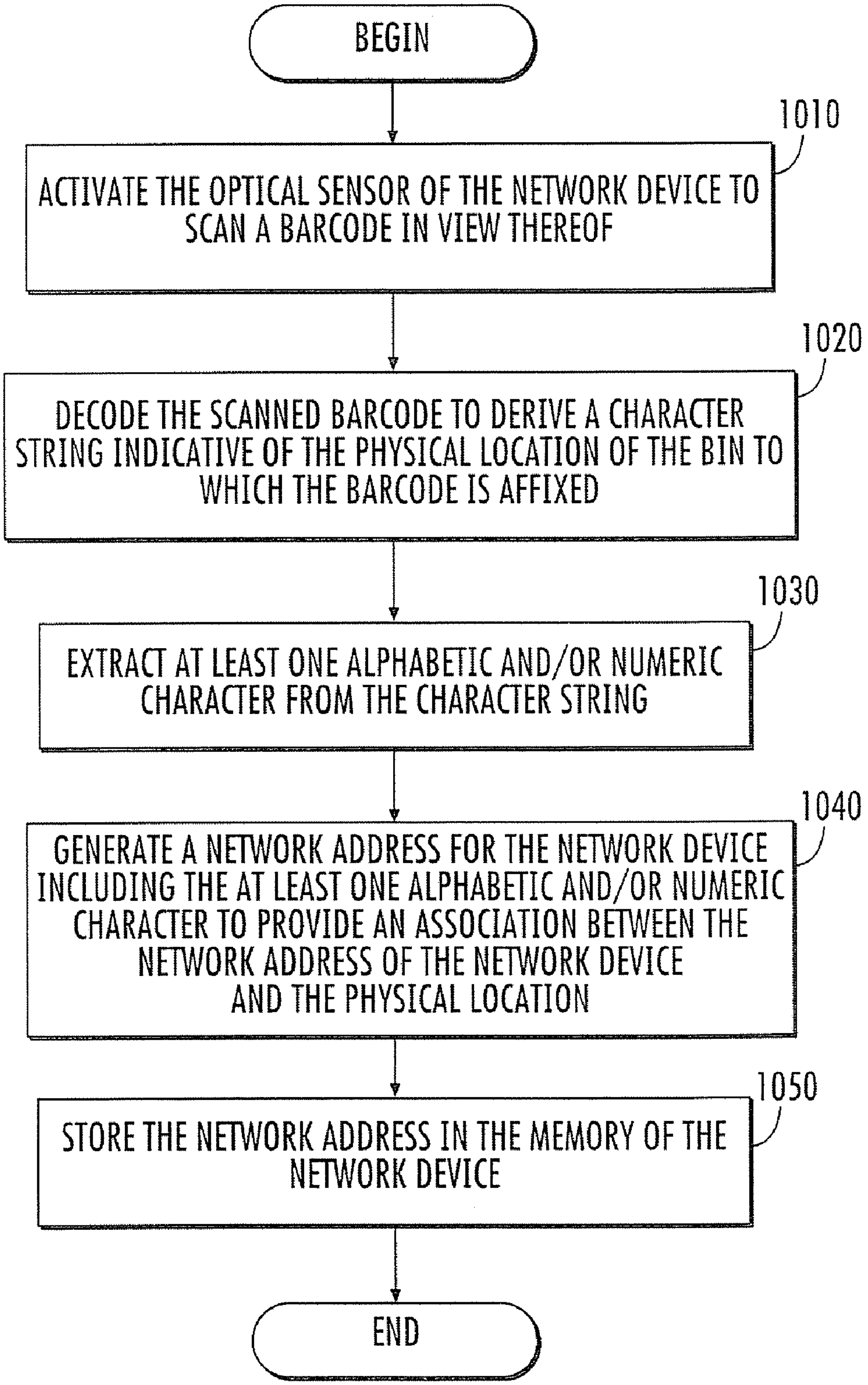
FIG. 10 is a flowchart illustrating example operations performed by network devices according to some embodiments of the present invention in greater detail.

FIG. 9 illustrates elements of column “H” of the exemplary apparatus 100 described above with respect to FIGS. 1-5 in cross-section, while FIG. 10 is a flowchart illustrating example operations performed by the network device 322*h* of the apparatus 100 in greater detail. In FIG. 9, a bin 306 is positioned at a closed dispensing station door 116*h*. The bin 306 is representative of all bins in the chain 300. When an empty bin 306 is positioned at the door 116*h*, its open end faces the door, such that the barcode 654 along the upper edge of the bin 306 is in the line of sight 326 of the optical sensor 395*h* of the network device 322*h*. The network device 322*h* may thereby use the barcode 654 of the empty bin 306 to determine and automatically assign itself a network address based on the information represented by the barcode 654.

More particularly, with reference to FIG. 10, the processor 315*h* of the network device 322*h* activates its optical sensor 395*h* to scan the barcode 654 in its line of sight 326 (Block 1010). The processor 315*h* decodes the scanned barcode to derive a character string therefrom (Block 1020). The character string is an alphanumeric string identifying the row and column of the bin 306 to which the barcode 654 is attached. In some embodiments, the data represented by the barcode 654 may include a two-digit numeric portion indicating the row (e.g., “02” in the example of FIG. 9) and a single alphabetic character portion representing the column (e.g., “H” in the example of FIG. 9), which are concatenated to provide the barcode data (e.g., “H02” in the example of FIG. 9). The processor 315*h* extracts at least one alphabetic and/or numeric character from the character string (Block 1030), and generates a network address for the network device 322*h* including the alphabetic and/or numeric character(s) (Block 1040). For example, as shown in FIG. 9, the physical location or position of the network device 322*h* in the array 322 corresponds to the column “H” of the matrix 310. As such, the processor 315*h* may extract the letter “H” from the scanned barcode data “H02,” and may automatically generate a logical network address for the network device 322*h*, where the logical network address includes the letter “H” as a character of the address and/or is derived therefrom. For instance, where the matrix 310 includes columns “A” to “H”, the extracted letter “H” may be converted to an ASCII code (i.e., “72”), and the ASCII code for the first column letter “A” (i.e., 65) may be subtracted from the column “H” ASCII code to provide the network address for the device 322*h* (i.e., 72−65=7 in this example). The address generated by the processor 315*h* is then automatically stored in the memory 375*h* of the network device 322*h* as its network address (Block 1050). Accordingly, the logical address that is automatically assigned to the network device 322*h* indicates or otherwise reflects the physical location of the network device 322*h* (e.g., in column “H”) whose barcode 654 is in view of its optical sensor.

FIG. 9 also illustrates an example of a product 650 intended to be dispensed from the apparatus 100. The product is contained in the package 650, which includes a transaction information location on a thin end 652 thereof. A label on the thin end 652 retains transaction information related to the product. For example, the label may be an optically-discernable barcode, similar to the barcode 654 on each bin, that is encoded with the transaction information. The transaction information on the product or package 650 may include, for example, an identification of the product, a price, an inventory number, and so on; it may also contain the identification of a recipient who has paid for the product, or who is authorized or required to receive it. The product, package, or envelope 650 is loaded into a bin 306' such that the thin end 652 including the transaction information is urged to a predetermined information-reading position to retain the thin end 652 where the transaction information be sensed or read. In particular, as shown in FIG. 9, when a package 650 is placed in the bin 306', the label on the thin end 652 may be urged to a position that covers the barcode 654 on the bin 306, so that the transaction information may be scanned from the label by the optical sensor **395*h* of the network device 322*h* when the bin 306' is positioned in its line of sight 326**.

As such, once the network addresses have been assigned to the network devices **322*a* to 322*h*, the network device controller 301 may selectively transmit a command from the network controller to a particular one of the network devices 322*a* to 322*h* to activate the optical sensor thereof. For example, once the apparatus has been assembled and the chain of bins 300 has been rotated such that the bin 306' is positioned adjacent to the door 116*h*, the network device controller 301 may transmit a command to a particular network device 322*h* to scan the label on the package 650 contained in the corresponding bin 306' and identify the contents of the package 650 based on the information scanned from the label. In the example shown, a retainer 656 integral with the package 650 retains the package 650 and positions the thin end 652 to cover the barcode 654 on the upper surface of the bin. The package 650 may be flexible, made of plastic film or reinforced paper, and the retainer 656 may be semi-rigid, made of cardboard or thin plastic, so that it may buckle, flex, or bend. The retainer 656 may include holes therein it to ease insertion into and removal from the bin 306'. The retainer 656 acts between a side of a bin and the thin end 652 such that the transaction information is positioned in the line of sight 326 of the sensor 395*h* when the bin 306' is rotated to the position adjacent to the door 116*h***.

Although embodiments of the present invention have been described herein with reference to barcodes, it will be understood that the network address of each network device may be derived from any visual identifier affixed to or otherwise positioned in the line of sight of its optical sensor. In addition, it will be understood that some embodiments of the present invention may use radio frequency identification (RFID) tags (instead of and/or in addition to barcodes) encoded with the alphabetic and/or numeric character strings indicating the locations of the respective bins 306 to which they are affixed, and the network devices **322*a* to 322*h* may each include a respective RFID reader (instead of and/or in addition to the optical sensors 395*a* to 395*h*) operable to receive, analyze, and/or decode data provided by the RFID tag on the bin 306 in its proximity. As such, each of the processors 315*a* to 315*h* may be operable to assign a respective network address to its corresponding network device 322*a* to 322*h* based on the location information derived from the data received from the RFID tag on a bin 306** proximate thereto.

Moreover, although discussed primarily herein with reference to use in an automated pharmaceutical dispensing apparatus, it will be understood that embodiments of the present invention are not limited to such a use, but rather, may generally be used in any system or network of communicatively coupled network devices where one or more of the network devices can automatically determine and assign its own network address according to data provided by a sensor thereof. Embodiments of the present invention can thereby eliminate the need for human intervention typically required when setting dipswitches or populating look-up tables in order to assign network addresses to network devices. This can eliminate potential errors and/or costs associated with manual configuration methods, and can improve reliability by eliminating the need for electromechanical switches.

The present invention has been described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

It will be further appreciated that the functionality of any or all of the program modules may also be implemented using discrete hardware components, one or more application specific integrated circuits (ASICs), or a programmed digital signal processor or microcontroller. The program code may execute entirely on a single processor and/or across multiple processors, as a stand-alone software package or as part of another software package. The program code may execute entirely on an electronic device or only partly on the electronic device and partly on another device. In the latter scenario, the other device may be connected to the electronic device through a wired and/or wireless local area network (LAN) and/or wide area network (WAN), or the connection may be made to an external computer (for example, through the Internet using an Internet Service Provider).

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

That which is claimed:

1. A method for configuring a network device including an optical sensor, the method comprising:

activating the optical sensor of the network device to generate data representing an image in view thereof, wherein the network device is one of a plurality of communicatively coupled nodes in a system;

analyzing the data from the optical sensor to determine image information represented by the image, wherein the image information comprises an alphabetic and/or numeric character string, and wherein the image information indicates a physical location of the image in the system; and automatically assigning a network address to the network device based on the physical location of the image in view of the optical sensor by:

extracting at least one alphabetic and/or numeric character from the character string;

generating the network address to include a representation of the at least one alphabetic and/or numeric character using a predetermined algorithm such that the network address indicates the physical location of the image in view of the optical sensor; and storing the network address in a memory of the network device.

2. The method of claim 1, wherein the image in view of the optical sensor comprises a barcode representing the character string.

3. The method of claim 1, wherein the system comprises a matrix including a plurality of rows and columns, and wherein the character string identifies a row and/or a column in the matrix corresponding to the physical location of the image in the system.

4. The method of claim 3, wherein the plurality of nodes are arranged in a same row of the matrix, and wherein the character string comprises an alphabetic character that identifies a column of the matrix corresponding to a physical location of the network device.

5. The method of claim 3, wherein the system comprises an automated pharmaceutical dispensing apparatus including a plurality of bins configured to store filled prescriptions therein, wherein the plurality of bins are arranged along the rows and columns of the matrix, and wherein each of the plurality of bins includes a respective barcode affixed thereto, wherein the image in view of the optical sensor comprises one of the respective barcodes, and wherein the character string represented by the one of the respective barcodes identifies the row and/or column of one of the plurality of bins to which the barcode is affixed.

6. The method of claim 1, wherein the network address comprises one of a predetermined set of network addresses generated using the predetermined algorithm, and further comprising:

transmitting an activation command from a network controller to the plurality of nodes in the system based on the predetermined set of network addresses, wherein activating the optical sensor of the network device is performed in response to the activation command.

7. The method of claim 6, further comprising:

associating the network address assigned to the network device with the physical location in the system indicated by the character string; and then selectively transmitting a command from the network controller to the network device among the plurality of nodes to activate the optical sensor thereof to identify an item in view thereof at the corresponding physical location, wherein the item in view of the optical sensor at least partially obscures the image at the corresponding physical location.

8. A system, comprising:

a plurality of communicatively coupled network devices, the network devices respectively comprising:

an optical sensor that is operable to generate data representing a respective image in view thereof, and a processor that is operable to activate the optical sensor, analyze the data to derive respective image information indicative of a physical location of the respective image in the system therefrom, wherein the respective image information comprises a respective alphabetic and/or numeric character string, and automatically assign a respective network address to its corresponding network device based on the physical location of the respective image in view of the optical sensor by extracting at least one alphabetic and/or numeric character from the respective character string, generating the respective network address to include a representation of the at least one alphabetic and/or numeric character using a predetermined algorithm such that the respective network address indicates the physical location of the respective image in view of the optical sensor, and storing the respective network address in a memory of its corresponding network device.

9. The system of claim 8, wherein the respective image in view of the optical sensor comprises a barcode representing the respective character string.

10. The system of claim 8, wherein each of the respective character strings indicates a different physical location in the system.

11. The system of claim 10, further comprising:

a matrix including a plurality of rows and columns, wherein each of the respective character strings identifies a row and/or a column in the matrix.

12. The system of claim 11, wherein the network devices are arranged in a same row of the matrix, and wherein each of the respective character strings comprises an alphabetic character that identifies a column of the matrix corresponding to a physical location of one of the network devices.

13. The system of claim 11, wherein the system comprises an automated pharmaceutical dispensing apparatus, and further comprising:

a plurality of bins configured to store filled prescriptions therein, wherein the plurality of bins are arranged along the rows and columns of the matrix, and wherein each of the plurality of bins includes a respective barcode affixed thereto, wherein the respective image in view of the optical sensor comprises one of the respective barcodes, and wherein each of the respective character strings identifies the row and/or column of one of the plurality of bins to which the respective barcode is affixed.

14. The system of claim 10, wherein the respective network addresses comprise ones of a predetermined set of network addresses generated using the predetermined algorithm, and further comprising:

a network controller coupled to the plurality of network devices and operable to transmit an activation command thereto based on the predetermined set of network addresses, wherein the respective processors of the network devices are configured to activate the respective optical sensors thereof to generate the respective data representing the respective images in view thereof in response to the activation command.

15. The system of claim 14, wherein the network controller is further operable to associate the respective network addresses assigned to the corresponding ones of the plurality of network devices with the respective physical locations in the system indicated by the respective character strings, and then selectively transmit a command from the network controller to one of the plurality of network devices to activate the optical sensor thereof to identify an item in view thereof at the corresponding physical location, wherein the item in view of the optical sensor at least partially obscures the respective image at the corresponding physical location.

16. An automated pharmaceutical dispensing apparatus, comprising:

a plurality of bins configured to store filled prescriptions therein, wherein the bins include respective barcodes affixed thereto;

a plurality of communicatively coupled scanners, the scanners respectively comprising:

an optical sensor that is operable to generate data representing a respective barcode in view thereof; and circuitry that is operable to activate the optical sensor, analyze the data to determine image information represented by the respective barcode, wherein the image information comprises a respective alphabetic and/or numeric character string and indicates a physical location of the respective barcode in the apparatus, and automatically assign a respective network address to its corresponding scanner based on the physical location of the respective barcode in view of the optical sensor by extracting at least one alphabetic and/or numeric character from the respective character string, generating the respective network address to include a representation of the at least one alphabetic and/or numeric character using a predetermined algorithm such that the respective network address indicates the physical location of the respective barcode in view of the optical sensor, and storing the respective network address in a memory of its corresponding scanner.

17. The apparatus of claim 16, wherein the respective alphabetic and/or numeric character strings indicate respective physical locations in the apparatus of ones of the plurality of bins to which the respective barcodes are affixed.

18. The apparatus of claim 17, wherein the plurality of bins are arranged in a matrix including a plurality of rows and columns, and wherein each of the respective character strings identifies a row and/or a column of one of the plurality of bins to which the respective barcode is affixed.

19. The apparatus of claim 18, wherein the respective network address of each scanner indicates the respective physical location of the bin to which the respective barcode is affixed.

20. The apparatus of claim 19, wherein the plurality of scanners are arranged in a same row of the matrix, and wherein each of the respective character strings comprises an alphabetic character that identifies a column of the matrix corresponding to a physical location of one of the scanners.

21. A method for configuring a network device, the method comprising:

activating an optical sensor of the network device to receive data;

analyzing the data from the optical sensor to determine physical location information represented thereby, wherein the physical location information comprises an alphabetic and/or numeric character string and indicates a physical location in a system; and automatically assigning a network address to the network device based on the physical location indicated by the data from the optical sensor by extracting at least one alphabetic and/or numeric character from the character string, generating the network address to include a representation of the at least one alphabetic and/or numeric character using a predetermined algorithm such that the network address indicates the physical location, and storing the network address in a memory of the network device.

* * * * *